United States Patent [19]

Mikami et al.

[11] 4,436,787

[45] Mar. 13, 1984

[54] DURABLE PRIMER COMPOSITION

[75] Inventors: Ryuzo Mikami; Katsuyoshi Nakasuji, both of Ichihara, Japan

[73] Assignee: Dow Corning Corporation, Midland, Mich.

[21] Appl. No.: 463,379

[22] Filed: Feb. 3, 1983

[30] Foreign Application Priority Data

Feb. 19, 1982 [JP] Japan ................................. 57-25551

[51] Int. Cl.$^3$ .............................................. B32B 9/04
[52] U.S. Cl. .................................... 428/447; 525/523; 525/476; 525/487; 428/413; 528/17; 528/27
[58] Field of Search .................... 528/27, 17; 525/523, 525/487, 476; 428/447, 413

[56] References Cited

U.S. PATENT DOCUMENTS 4,283,513 8/1981 Mikami ................................ 525/476
4,287,326 9/1981 Mikami ................................ 525/476

Primary Examiner—Melvyn I. Marquis
Attorney, Agent, or Firm—Roger H. Borrousch

[57] ABSTRACT

A primer composition which has excellent durability when immersed in water is made from a silicone-modified epoxy resin, an aminoxy silicon compound, and an organotitanate. The primer composition is particularly useful for bonding room temperature vulcanizable silicone rubber or room temperature vulcanizable silicone-modified organic rubber to building substrate materials.

11 Claims, No Drawings

DURABLE PRIMER COMPOSITION

BACKGROUND OF THE INVENTION

1. Field of the Invention

This invention relates to primer compositions. In particular, this invention relates to primer compositions which are used for the firm adhesion of room temperature-curable silicone rubbers or room temperature-curable silicone-modified organic rubbers to various types of substrate surfaces with which the silicone rubbers are in contact during the curing.

2. Description of the Prior Art

Today, room temperature vulcanizable silicone rubbers are used in large quantity as a sealing material in buildings because the durability of the rubber itself is far superior to organic rubbers. Room temperature vulcanizable silicone-modified organic rubbers are also used as a sealant for buildings. Because many different materials are used in buildings, it is important that the room temperature vulcanizable silicone rubbers and the room temperature vulcanizable silicone-modified organic rubbers firmly bond to the different substrate materials. The substrates can be, for example, metals such as aluminum, steel, and stainless steel; coated building materials such as aluminum coated with acrylic resin, urethane resin, or epoxy resin; hard inorganic building materials such as glass, tiles, and building stones; and porous inorganic base materials such as mortar, concrete, and ALC. Conventional procedure is to pretreat such substrates with an appropriate primer, designed for the particular substrate, thus many different primers are used. Thereafter room temperature vulcanizable silicone rubber or room temperature vulcanizable silicone-modified organic rubber is applied and a bond is formed during the curing process. However, it is difficult to bond these rubbers to such substrates as pure aluminum, surface-treated aluminum, stainless steel, aluminum coated with various resins, and mortar. Attempts to bond the rubbers to these substrates gives rise to problems, such as deterioration of the rubber and peeling at the interface between the rubber and the substrate. Therefore, primers which can maintain a strong bond strength for a long period, in particular, those which can maintain a strong bond strength for a long period even when immersed in water, are in demand.

The inventors in U.S. patent application, Ser. No. 399,606, filed July 19, 1982, describe single-component type primer compositions comprised of silicone-modified epoxy resins having epoxy groups and silicon-bonded alkoxy groups and organotitanates, said application being hereby incorporated by reference to show the preparation of the silicone-modified epoxy resins. However, when used as primers for cement porous building materials such as mortar, they are not quite satisfactory because the room temperature-curable silicone rubber adhered is easily peeled by immersing the materials in ambient or warm water for a long period of time.

The inventors conducted extensive investigations in an attempt to solve the above-mentioned problems of the conventional primer compositions. As a result, the following phenomenon was found.

SUMMARY OF THE INVENTION

When an aminoxy organosilicon compound containing at least one silicon-bonded aminoxy radical per molecule is added to a composition comprised of an organotitanate and a silicone-modified epoxy resin which is obtained by the condensation reaction between the hydroxyl group of an epoxy resin and alkoxy group of a compound with the elimination of alcohol, the compositions exhibit excellent air-drying ability. Further investigation led to the discovery that these compositions used as primers for cement porous building materials such as mortar, to which is bonded room temperature vulcanizable silicone rubber or room temperature vulcanizable silicone-modified organic rubber that these rubbers are not easily peeled from the substrates after immersion in ambient or warm water for a long period of time.

The purpose of this invention is to offer single package type primer compositions which are highly durable, exhibit excellent air-drying ability and which are capable of adhering various rubbers, especially room temperature vulcanizable silicone rubbers or room temperature vulcanizable silicone-modified organic rubbers firmly to various substrate materials even when immersed in water.

This invention relates to a primer composition comprising (A) 100 parts by weight of a silicone-modified epoxy resin which has both epoxy groups and silicone-bonded alkoxy radicals, said silicone-modified epoxy resins being the condensation reaction product between (a) an alkoxy silicon compound being expressed by the average unit formula

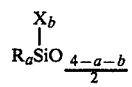

wherein R represents a monovalent radical selected from the group consisting of hydrocarbon radicals and substituted hydrocarbon radicals having at least one hydrogen atom substituted by a halogen atom, cyano, mercapto, hydroxyl, methacryloxy, acryloxy, glycidoxy, and 3,4-epoxycyclohexyl, X represents an alkoxy radical or an alkoxyalkoxy radical, a has a value from 0 to 2 inclusive, b has a value from 1 to 4 inclusive and the sum of a+b has a value from 1 to 4 inclusive, (b) an epoxy resin having both epoxy groups and hydroxyl radicals in the molecules, where (a) and (b) are present in amounts sufficient to satisfy the following relationship $$\frac{\text{equivalent number of alkoxy radicals in } (a)}{\text{equivalent number of hydroxyl radicals in } (b)} \geq 1$$

(B) 10 to 100 parts by weight of an aminoxy organosilicon compound having per molecule at least one silicon-bonded aminoxy radical which is expressed by the formula

wherein $R^1$ represent hydrogen atom, a monovalent hydrocarbon radical, a halogenated monovalent hydrocarbon radical, or two radicals represented by $R^1$ can be bonded together, and (C) 0.1 to 100 parts by weight of an organotitanate.

DETAILED DESCRIPTION OF THE INVENTION

Component (A) is a silicone-modified epoxy resin and is a primary component of the primer compositions of this invention. The silicone-modified epoxy resin of (A) is a condensation reaction product of an alkoxy silicon compound, (a), and an epoxy resin, (b), having both epoxy groups and hydroxyl radicals in the same molecule.

The alkoxy silicon compound, (a), is defined by the stated average unit formula and can be a silane or a polysiloxane. In (a), R can be a monovalent hydrocarbon radical, such as an alkyl radical being exemplified by methyl, ethyl, propyl, and octadecyl; an alkenyl radical being exemplified by vinyl and alkyl; an aryl radical being exemplified by phenyl. R can also be a substituted hydrocarbon radical in which at least one hydrogen atom is replaced by a halogen atom exemplified by fluorine and chlorine, cyano, mercapto, hydroxyl, methacryloxy, acryloxy, glycidoxy, and 3,4-epoxycyclohexyl. X represents an alkoxy radical such as methoxy, ethoxy, and propoxy or an alkoxyalkoxy such as methoxyethoxy. As indicated by the value of a, R does not need to be present in (a). The reason why a is 2 or less and b is 1 or greater is that if the amount of alkoxy radical is too low, the degree of condensation with the hydroxyl radical in (b) is low and the amount of silicon-bonded alkoxy radical is too low in (A), resulting in insufficient curing, namely insufficient adhesion. From this reason, it is desirable that at least two X per molecule are present in (a) and at least three X per molecules are present in (A). When polysiloxanes are used, the degree of polymerization can be 2 or greater, but it is preferred to be not too high. The molecular configuration of the polysiloxanes can be linear, branched chain, or network structure. Small amounts of silicone-bonded hydroxyl groups, halogen atoms, or hydrogen atoms can be included. Examples of (a) are as follows: methyltrimethoxysilane, dimethyldiethoxysilane, ethyltriethoxysilane, phenyltrimethoxysilane, methylphenyldiethoxysilane, vinyltrimethoxysilane, vinyltri(methoxyethoxy)silane, methylvinyldimethoxysilane, allyltripropoxysilane, γ-chloropropyltriethoxysilane, γ-methacryloxypropyltrimethoxysilane, methyl(γ-methacryloxypropyl)dimethoxysilane, γ-glycidoxypropyltrimethoxysilane, β-(3,4-epoxycyclohexyl)ethyltrimethoxysilane, tetramethoxysilane, tetraethoxysilane, tetrapropoxysilane, tetrabutoxysilane, and their partial hydrolysis condensates such as ethylpolysilicate. These compounds can be used singly or as a mixture. In particular, low molecular weight organoalkoxysilanes such as methyltrimethoxysilane and ethyltrimethoxysilane are suitable because they react easily with the hydroxyl groups in the epoxy resins. Moreover, γ-mercaptopropyltrimethoxysilane and γ-glycidoxypropyltrimethoxysilane are suitable because of their effect of improving the adhesion with substrate materials is great.

The epoxy resin, (b), which is the other starting material for (A) contains at least one hydroxyl radical and epoxy group per molecule. Examples of (b) can be selected from the bisphenol series and novolak series. In particular, an epoxy resin from the bisphenol series is preferred. An especially suitable epoxy resin is a condensate between bisphenol A and epichlorohydrin which is expressed by the following general formula

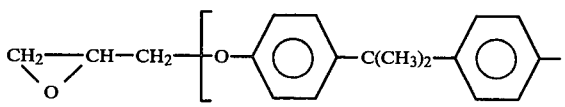

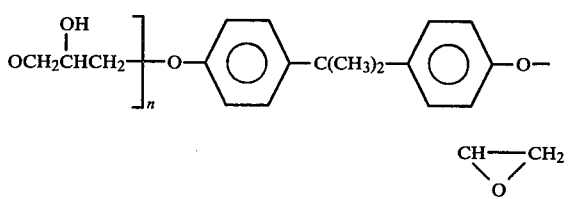

in which n is an integer of 1 to 19. The preferable hydroxyl radical equivalent range is 100–220. If the hydroxyl group equivalent is less than this range, the amount of modification by the alkoxy silicon compound is small and it is difficult to form a satisfactory film. If the hydroxyl radical equivalent exceeds 220, the unreacted hydroxyl radicals are likely to remain after the reaction under the conditions used for the condensation reaction between (a) and (b). Residual hydroxyl radicals in (A) causes the storage stability to decline during the condensation reaction or when an organotitanate, (C), is added to (A), thickening and gelation occur. The preferable epoxy equivalent range is 180 to 4000. An average molecular weight preferably ranges from 300 to 6000 and most preferably from 700 to 2000. (A) is obtained by the condensation reaction, with the elimination of alcohol, between the alkoxy radicals in (a) and the hydroxyl radicals in (b) by mixing (a) and (b) at a temperature exceeding the boiling point of the alcohol to be eliminated. This reaction proceeds relatively easily when the reaction is carried out without any catalysts or in the presence of a small amount of condensation reaction catalyst at a temperature of 80° to 160° C. while the alcohol is removed from the system. Solvents or diluents can be used in this reaction. Examples of organic solvents are toluene, xylene, and ethylacetate. The point to be carefully considered in this reaction is that the residual hydroxyl radicals in the epoxy resin must be minimized as much as possible. For this reason, it is advantageous to use a small amount of condensation reaction catalyst. With respect to the condensation reaction between (a) and (b), the reaction is carried out such that the ratio between (a) and (b), represented by the relationship $$\frac{\text{Equivalent number of the alkoxy radicals in } (a)}{\text{Equivalent number of the hydroxy radicals in } (b)} \geq 1$$

is satisfied. If the ratio is less than 1, gelation occurs easily during the condensation reaction. The preferred ratio is in the range of 5 to 25. Although gelation does not occur during the condensation reaction, gelation occurs easily when an organotitanate, (C), is added to (A). As this ratio increases, it is difficult for the gelation to occur during the condensation reaction and at the time of addition of (C).

The equivalent number of the alkoxy radicals in (a) means an equivalent number of the silicon-bonded alkoxy radicals included in grams of (a) supplied for the reaction between (a) and (b).

For example, the equivalent number of alkoxy radicals in 4.5 g of methyltrimethoxysilane is 0.10 equivalent. This can be explained as follows. One mole of silane is 136 g. Since one molecule of silane has three alkoxy radicals, 3 equivalents of alkoxy radical are in 1 mole of silane. The equivalent number of alkoxy radicals in 4.5 g of silane is 3 equivalent×(4.5 g/136 g)=0.10 equivalent. The equivalent number of the hydroxyl radicals in (b) means an equivalent number of hydroxyl radicals in the grams of (b) supplied for the reaction between (a) and (b).

The aminoxy organosilicon compound, (B), makes the air-drying ability of the primer compositions of this invention quicker. In addition, it improves adhesiveness to the substrate materials and adhesion durability of room temperature vulcanizable silicone rubbers or room temperature vulcanizable silicone-modified organic rubbers to the cured films of the primer compositions, especially adhesion durability when immersed in water.

At least one silicon-bonded aminoxy radical expressed by the formula $R_2^1NOSi\equiv$ must be present in each molecule of this component. In terms of the air-drying ability and the effect of improvement of adhesion durability, it is preferred that at least two aminoxy radicals be present. $R^1$ represents hydrogen, monovalent hydrocarbon radicals, and halogenated monovalent hydrocarbon radicals. Examples of $R^1$ are monovalent hydrocarbon radicals such as alkyl radicals exemplified by methyl and propyl, cycloalkyl radicals such as cyclohexyl and cycloheptyl; aryl radicals such as phenyl; aralkyl radicals such as benzyl, and halogenated monovalent hydrocarbon radicals such as halogenated alkyl radicals such as γ-chloropropyl.

(B) can be selected from among silanes or polysiloxanes. The degree of polymerization for the polysiloxanes is 2 or greater. The molecular configuration can be linear chain, branched chain, cyclic, or network structure. From the standpoint of compatibility with other ingredients and coating workability onto the substrate materials, those which are available in the liquid form at ambient temperature are preferred.

The aminoxy radical in the polysiloxane can be present at the ends of the molecular chain of (B) or in the side chains. The silicon-bonded organic radicals which are present in the silanes and polysiloxanes are the same as R in (A). The sample examples are applicable. Examples of (B) are as follows:

$(CH_3)_2Si\{ON(C_2H_5)_2\}_2$, $CH_3Si\{ON(C_2H_5)_2\}_3$,
$(CH_3)_2Si(ONHC_6H_5)_2$, $(C_2H_5)_2NO\{(CH_3)_2SiO\}_2N(C_2H_5)_2$,
$(C_2H_5)_2NO\{(CH_3)_2SiO\}_3N(C_2H_5)_2$,
$(C_2H_5)_2NO\{(CH_3)_2SiO\}\{(C_6H_5)_2SiO\}\{(CH_3)_2SiO\}N(C_2H_5)_2$,
$(C_2H_5)_2NO\{(CH_3)_2SiO\}_6N(C_2H_5)_2$, $(CH_3)_3SiO\{(CH_3)_2SiO\}_2Si(CH_3)_3$
        |
        $ON(C_2H_5)_2$

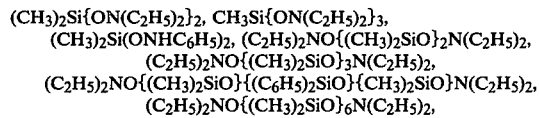

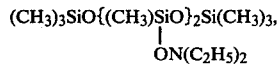

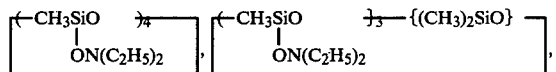

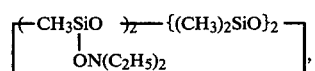

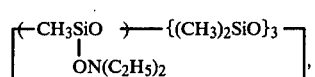

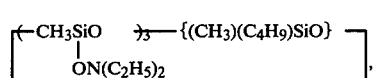

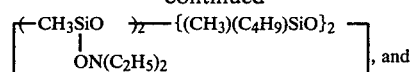

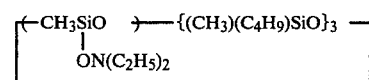

(B) is added in an amount of 10 to 100 parts by weight relative to 100 parts by weight of (A). If the amount added is less than 10 parts by weight, the adhesion durability, especially adhesion durability when immersed in ambient water or warm water for a long period, is insufficient when the primer compositions are coated over the cement porous substrate materials such as mortar, and air-dried, and room temperature vulcanizable silicone rubbers or room temperature vulcanizable silicone-modified organic rubbers are applied and cured. If the amount added exceeds 100 parts by weight, adhesion durability, especially adhesion durability when immersed in warm water, is reduced when the primer compositions are coated over metals and air-dried, and room temperature vulcanizable silicone rubbers or room-temperature vulcanizable silicon-modified organic rubbers are applied and cured.

Organotitanates, (C), have little effect on (A) in the absence of moisture. In the presence of moisture, (C) helps to carry out the condensation reaction of the alkoxy groups in (A) to cure primer compositions of this invention so that the air-drying ability is imparted. Moreover, it improves bonding to the substrate materials and adhesiveness of room temperature vulcanizable silicone rubbers or room temperature vulcanizable silicone-modified organic rubbers to the cured film of primer compositions, especially adhesion durability.

Examples of (C) are as follows: titanic acid esters of monohydric alcohols such as methyl alcohol, ethyl alcohol, isopropyl alcohol, butyl alcohol, cyclohexyl alcohol, octyl alcohol, and octadecyl alcohol; titanic acid esters of dihydric alcohols such as ethylene glycol, propylene glycol, octylene glycol, diethylene glycol, tripropylene glycol, and tetraethylene glycol; titanic acid esters of trihydric alcohols such as glycerine; titanium chelates such as di-n-butoxy-bis(ethyl acetylacetate)titanium, diisopropoxy-bis(acetylacetonate)titanium, di-n-butoxy-bis(triethenolaminate)titanium; dihydroxy-bis(lactate)titanium, and partially hydrolyzed products of these titanium compounds. These compounds can be used singly or as a mixture of two or more types. This component is added in an amount of 0.1 to 100 parts by weight relative to 100 parts by weight of (A). In terms of the air-drying ability, adhesiveness and storage stability, a preferable amount of addition ranges from 5 to 25 parts by weight. The primer compositions of this invention can be produced by simply mixing the above-mentioned three components. Because (B) and (C) are sensitive to moisture, they can be added in the absence of moisture or the container can be filled with dry air or dry nitrogen after mixing and sealed for storage.

When the primer compositions are coated over the substrate materials, they can be diluted with organic solvents if the viscosity is too high or if a thin film is desired to be formed. Examples of these organic solvents are toluene, xylene, and ethyl acetate. If the viscosity is too low or is a thick film is desired to be formed, various types of inorganic fillers such as finely pulverized silica can be added. The filler which is preferred for this purpose is hydrophobic silica filler whose surface has been treated, for example, by trimethylsilylation. Moreover, organosilicon compounds besides (A) and (B), such as unreacted (a), conventionally known heat resisting agents, coloring agents, and other additives such as red iron oxide, cerium oxide, fatty acid iron salts, and titanium oxide can be added arbitrarily, as long as, the purpose of this invention is not interfered with.

The primer compositions of this invention are produced as single package type compositions so that they exhibit excellent storage stability and air-drying ability. The compositions can firmly adhere with excellent durability room temperature vulcanizable silicone rubbers or room temperature vulcanizable silicone-modified organic rubbers to various types of substrate materials which are brought into contact with these rubbers during the curing process. Especially, their adhesion durability when immersed in ambient water or warm water for a long time is excellent. Therefore, these compositions are primers for the substrate materials. The room temperature vulcanizable silicone rubbers can be of either the single package type or two package type. Moreover, the hydrolyzable groups in these room temperature rubber composition can be, for example, silicon-bonded alkoxy, ketoximo, amino, aminoxy and acyloxy. The room temperature vulcanizable silicone-modified organic rubbers can also be of either the single package type or two package type. Examples are polyether rubbers with both alkoxysilylated ends, polybutadiene rubbers with both alkoxysilylated ends and polyurethane rubbers with both alkoxysilylated ends.

When the substrate materials with poor adhesiveness such as pure aluminum, surface-treated aluminum, coated aluminum, stainless steel, mortar, and concrete are pretreated with the primer compositions of this invention, the above-mentioned rubbers are adhered firmly and with high durability. Therefore, the sealing joints in buildings wherein different types of substrate materials are used can be easily achieved.

Examples of this invention will be explained in the following. The viscosity was the value determined at 25° C. "Parts" indicated in these examples mean "parts by weight."

REFERENCE EXAMPLE

A bisphenol type epoxy resin (Epitate 1001 by Shell Chemical Co., Ltd.) having a mean molecular weight of 900–1000, a hydroxyl value (equivalent/100 g) of 0.353 and epoxy value (equivalent/100 g) of 0.208 and methyltrimethoxysilane (SH 6070 by Toray Silicone Co., Ltd.) were reacted in the amounts shown in Table I. The reaction conditions were based on the reaction conditions described in the following Example 1. When tetrabutyltitanate was added to 100 parts of the silicone-modified epoxy resin solution obtained above, gelation occurred immediately in Sample No. 1. The silicone-modified epoxy resin of Sample No. 1 had a ratio of equivalent number of methoxy radicals in the methlytrimethoxysilane/equivalent number of the hydroxyl radicals in the epoxy resin of less than 1.0, namely 0.62.

Thickening was not detectable in Sample No. 2 where the silicone-modified epoxy resin had a ratio of greater than 1.0, namely 6.2, and a homogeneous solution was maintained. Composition No. 4 containing tetrabutyltitanate was coated over a stainless steel plate and the dry state of the coat was examined. The results are presented in Table II. The silicone-modified epoxy resin content (solid content) in the Sample No. 1 silicone-modified epoxy resin solution was 45 wt% and the silicone-modified epoxy resin content (solid content) in Sample No. 2 was 35 wt%.

TABLE I

| Formulation For Making Silicone-Modified Epoxy Resin | | |
|---|---|---|
| | Sample No. | |
| Ingredients | 1 | 2 |
| Epikote 1001 | 45.5 g | 25.0 g |
| (equivalent number of hydroxy radicals) | (0.16) | (0.088) |
| Methyltrimethoxysilane | 4.5 g | 25.0 g |
| (equivalent number of methoxy radicals) | (0.01) | (0.55) |
| Tetrabutyltitanate | 0.01 | 0.01 |
| Toluene | 50.0 | 50.0 |
| Equivalent number of the methoxy radicals / Equivalent number of the hydroxyl radicals | 0.62 | 6.2 |

TABLE II

| | Sample No. | |
|---|---|---|
| Ingredients | 3 | 4 |
| Silicone-modified epoxy resin solution of Sample 1 | 100 | 0 |
| Silicone-modified epoxy resin solution of Sample ! | 0 | 100 |
| Tetrabutyltitanate | 10 | 7.8 |
| Changes in appearance | immediate gelation | No abnormality |
| Contact drying time* (min) | — | 10 |

*Time required when the surface became tack-free and no fingerprints were transferred.

EXAMPLE 1

In a 2 liter 3-necked flask equipped with a stirring device, a reflux condenser, and a thermometer, 450 g (1.59 hydroxyl radical equivalents) of the bisphenol type epoxy resin as described in the Reference Example, 1050 g (23.2 methoxy radical equivalents) of methyltrimethoxysilane and 1 g of tetrabutyl-titanate (equivalent number of the methoxy radicals/equivalent number of the hydroxyl radicals=14.5) were admixed. The temperature was slowly elevated with stirring and the condensation reaction was carried out in the reflux state (88°–100° C.). The reaction mixture which was initially opaque slowly became a transparent liquid. Methyl alcohol produced as a by-product and the unreacted methyltrimethoxysilane were removed from the reaction system and the reaction mixture was continuously refluxed for 5 hours. At the end of reaction, a portion of the unreacted methyltrimethoxysilane was removed by evaporation. As a result, a light yellow transparent liquid with a nonvolatile fraction of 37.7 wt% was obtained. According to the results of gel permeation chromatography and IR spectral analysis, the nonvolatile fraction was found to be a silicone-modified epoxy resin containing both epoxy groups and methoxy groups which was obtained by the condensation reaction between the hydroxyl groups of epoxy resin and the methoxy groups of methyltrimethoxysilane. The volatile fraction was found to be methyltrimethoxysilane.

An aminoxysilicon compound of the formula

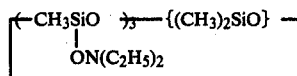

and tetrabutyltitanate were added in the amounts shown in Table III to the mixture of the silicone modified epoxy resin and methyltrimethoxysilane to prepare 4 types of primer compositions. These primer compositions were coated over a mortar plate with a size of 25×25×50 mm and a stainless steel plate with a 1.0×50×50 mm. The coatings were dried in air at 20° C. for 1 hour. An aminoxy type room temperature vulcanizable silicone rubber (SH 792 sealant by Toray Silicone Co., Ltd.) was applied on the primer-coated surfaces. Test samples, bonded test specimens, were obtained by curing at room temperature for 14 days. After the curing at room temperature for 14 days, one specimen was immersed in warm water at 50° C. for 7 days. After curing at room temperature for 14 days, another specimen was immersed in water at ambient temperature for 7 days. The tensile strength adhesion test was conducted at a rate of 50 mm/min. The conditions for the preparation of the bonded test specimens were based on the method specified in 5.1.2 of JIS-A-5758. The test results are summarized in Table IV.

TABLE III

| | Primer Compositions | | | |
|---|---|---|---|---|
| | Sample No. | | | |
| Ingredients | 5* | 6 | 7 | 8* |
| Silicone-modified epoxy resin (parts based on solids content), | 100 | 100 | 100 | 100 |
| Aminoxysilicon compound, parts | 0 | 25 | 50 | 110 |
| Tetrabutyltitanate, parts | 25 | 25 | 25 | 25 |

*Comparative Example

TABLE IV

| | | Results of evaluation of adhesion durability | | | | | | | | |
|---|---|---|---|---|---|---|---|---|---|---|
| | | Initial stage | | | After the immersion in warm water at 50° C. | | | After the immersion in water | | |
| Sample No. | Substrate Material | $M_{50}$ | $T_{MAX}$ | $E_{MAX}$ | $M_{50}$ | $T_{MAX}$ | $E_{MAX}$ | $M_{50}$ | $T_{MAX}$ | $E_{MAX}$ |
| 5 | Mortar | 1.1 | 4.2 | 683 | 0.9 | 0.9 | 60 | 1.0 | 4.0 | 530 |
| | Stainless steel | 1.4 | 6.8 | 893 | 1.0 | 7.0 | 1047 | 1.1 | 5.3 | 920 |
| 6 | Mortar | 1.2 | 4.7 | 668 | 1.0 | 2.0 | 298 | 1.1 | 4.6 | 670 |
| | Stainless steel | 1.3 | 6.8 | 868 | 1.1 | 5.8 | 800 | 1.1 | 6.8 | 900 |
| 7 | Mortar | 1.1 | 4.7 | 737 | 0.9 | 2.2 | 340 | 1.1 | 4.5 | 740 |
| | Stainless steel | 1.1 | 6.2 | 928 | 0.9 | 5.3 | 952 | 1.1 | 6.0 | 900 |
| 8 | Mortar | 1.0 | 4.7 | 755 | 0.9 | 2.2 | 428 | 1.0 | 4.5 | 700 |
| | Stainless steel | 1.0 | 5.6 | 932 | 0.9 | 1.0 | 70 | 0.9 | 1.3 | 120 |

$M_{50}$ Tensile stress at 50% elongation (kg/cm$^2$)
$T_{MAX}$ Maximum tensile stress (kg/cm$^2$)
$E_{MAX}$ Elongation at the maximum tensile stress (%)

According to the results mentioned above, the adhesion durability was not achieved without the addition of the aminoxysilicon compound when immersed in warm water in the case of a mortar substrate. On the other hand, the adhesion durability was not achieved with the addition of excess aminoxysilicon compound when immersed in warm water in the case of a stainless steel substrate.

EXAMPLE 2

A primer of Sample No. 7 in Example 1 was coated over various types substrates to make test specimens. The bonded test specimens were prepared as in Example 1 and the tensile strength adhesion test was conducted. The results are summarized in Table V.

TABLE V

| | Results of evaluation of adhesion durability | | | | | |
|---|---|---|---|---|---|---|
| | Initial stage | | | After the immersion in warm water at 50° C. | | |
| Substrate materials | $M_{50}$ | $T_{MAX}$ | $E_{MAX}$ | $M_{50}$ | $T_{MAX}$ | $E_{MAX}$ |
| Aluminum plate** | 1.1 | 5.7 | 907 | 0.8 | 5.3 | 948 |
| Aluminum plate*** | 1.2 | 6.1 | 903 | 1.0 | 5.9 | 925 |
| Glass plate | 1.3 | 6.6 | 920 | 1.0 | 3.3 | 735 |
| V-Chroma**** | 1.2 | 5.9 | 887 | 0.9 | 5.5 | 955 |
| Porcelain tile | 1.2 | 5.8 | 887 | 0.9 | 5.1 | 935 |
| Methacrylic resin plate | 1.2 | 6.0 | 700 | 1.2 | 7.7 | 862 |
| Polycarbonate resin plate | 1.2 | 8.1 | 867 | 1.2 | 7.9 | 868 |

**An aluminum plate which has been treated with alumite sulfate
***An aluminum plate which has been treated with alumite sulfate and coated with acrylic resin by baking
****An aluminum plate coated with a single-component poly-urethane resin paint for walls (Dainippon Paint Co., Ltd.) by baking

EXAMPLE 3

The primer of Sample No. 7 in Example 1 was coated over 4 sheets of mortar test plates and 4 sheets of aluminum test plates. These test plates were dried in air for 4 hours. Subsequently, a ketoxime single package type silicone sealant (SH 780 sealant by Toray Silicone Co., Ltd.) or alkoxy single package type silicone sealant (SH 9145 sealant by Toray Silicone Co., Ltd.) was applied as a room temperature vulcanizable silicone rubber over the primer coated surfaces of the identical types of two test plates. After curing at ambient temperature for 14 days, the test plates were peeled off. Fracture occurred in the rubber layer in all test specimens. The cohesive failure on the fractured surface was 100%.

EXAMPLE 4

An oxypropylene polymer with allyl groups at both ends (mean molecular weight 400, 100 g) was placed in an autoclave. Methyldimethoxysilane (23 g) and a platinum-ethylene complex (0.006 g) were added to the above-mentioned polymer and the mixture was stirred at 100° C. for 1 hour. Calcium carbonate (120 g), fumed silica filler (40 g), dioctyl phthalate (80 g), and dibutyltin dilaurate (2 g) were added to the reaction mixture to prepare a polyether room temperature vulcanizable rubber with alkoxysilyl terminals.

The primer of Sample No. 7 in Example 1 was coated over two sheets of mortar test plates and two sheets of aluminum test plates and the coatings were dried in air at ambient temperature for 4 hours. Subsequently, the above-mentioned room temperature vulcanizable rubber was applied between the primer coated surfaces of two sheets of identical test plates. After curing at ambient temperature for 14 days, the test plates were peeled off. Fracture occurred in the rubber layer in all test specimens. The cohesive failure on the fractured surface was 100%.

EXAMPLE 5

A silane with the formula $(CH_3O)_3SiCH_2CH(CH_3)_{CH_2}SH$ (0.020 g) was added to a 20 wt% xylene solution of polybutadiene capped with hydroxyl groups at both ends, which had such a molecular weight that it could be cured to form a rubber. The mixture was heated at 100° C. for 24 hours to form polybutadiene with alkoxysilyl terminals. Methyltrimethoxysilane (0.163 g) and titanium acetonylacetate (0.082 g) were added to the modified polybutadiene to prepare a room temperature vulcanizable rubber with alkoxysilyl terminals.

The primer of Sample No. 7 in Example 1 was coated over two sheets of mortar test plates and two sheets of aluminum test plates. The coatings were dried in air at ambient temperature for 4 hours. Subsequently, the above-mentioned room temperature vulcanizable rubber was applied between the primer coated surfaces of identical two sheets of test plates. After curing for 14 days, the test specimens were peeled off. Fracture occurred in the rubber layer in all test specimens and the cohesive failure on the fractured surface was 100%.

That which is claimed is:

1. A primer composition comprising
   (A) 100 parts by weight of a silicone-modified epoxy resin which has both epoxy groups and silicone-bonded alkoxy radicals, said silicone-modified epoxy resins being the condensation reaction product between
   (a) an alkoxy silicon compound being expressed by the average unit formula

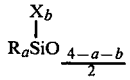

wherein R represents a monovalent radical selected from the group consisting of hydrocarbon radicals and substituted hydrocarbon radicals having at lease one hydrogen atom substituted by a halogen atom, cyano, mercapto, hydroxyl, methacryloxy, acryloxy, glycidoxy, and 3,4-epoxycyclohexyl, X represents an alkoxy radical or an alkoxyalkoxy radical, a has a value from 0 to 2 inclusive, b has a value from 1 to 4 inclusive and the sum of a+b has a value from 1 to 4 inclusive,
   (b) an epoxy resin having both epoxy groups and hydroxyl radicals in the molecules,
   where (a) and (b) are present in amounts sufficient to satisfy the following relationship $$\frac{\text{equivalent number of alkoxy radicals in } (a)}{\text{equivalent number of hydroxyl radicals in } (b)} \geq 1$$

(B) 10 to 100 parts by weight of an aminoxy organosilicon compound having per molecule at least one silicon-bonded aminoxy radical which is expressed by the formula

wherein R' represent hydrogen atom, a monovalent hydrocarbon radical, a halogenated monovalent hydrocarbon radical, or two radials represented by $R^1$ can be bonded together, and (C) 0.1 to 100 parts by weight of an organotitanate.

2. The primer composition according to claim 1 in which there are at least two X per molecule in (a), at least three silicon-bonded alkoxy radicals per molecule in (A), and (C) is present in an amount of from 5 to 25 inclusive parts by weight.

3. The primer composition according to claim 2 in which (a) and (b) are present in amounts sufficient to provide a ratio in the range from 5 to 25 of equivalent number of alkoxy radicals in (a) to equivalent number of hydroxyl radicals in (b).

4. The primer composition according to claim 3 in which (a) is methyltrimethoxysilane, (b) is a bisphenol type epoxy resin, (B) is

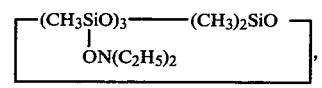

and (C) is tetrabutyltitanate.

5. An article comprising a substrate having a surface coated with a dried film derived from the primer composition of claim 1.

6. An article comprising a substrate having a surface coated with a dried film derived from the primer composition of claim 3.

7. An article in accord with claim 5 further comprising a cured room temperature vulcanizable silicone rubber bonded to the dried film where said cured rubber is cured while in contact with said dried film.

8. An article in accordance with claim 5 further comprising a cured room temperature vulcanizable silicone-modified organic rubber bonded to the dried film where said cured rubber is cured while in contact with said dried film.

9. An article in accordance with claim 5 in which the substrate comprises at least two different materials.

10. An article in accordance with claim 7 in which the substrate comprises at least two different materials.

11. An article in accordance with claim 8 in which the substrate comprises at least two different materials.

* * * * *

UNITED STATES PATENT AND TRADEMARK OFFICE
CERTIFICATE OF CORRECTION

PATENT NO. : 4,436,787
DATED : 463,379
INVENTOR(S) : Ryuzo Mikami and Katsuyoshi Nakasuji It is certified that error appears in the above-identified patent and that said Letters Patent is hereby corrected as shown below:

(73) Assignee - Reads "Dow Corning Corporation, Midland, Mich." should read "Toray Silicone Company, Ltd., Tokyo, Japan"

Column 8, Table II, line 31 - "of Sample!" should read "of Sample 1"

Column 9, notations under Table IV -
"$M_{50}$   Tensile stress at 50% elongation (kg/cm$^2$)"
"$T_{MAX}$  Maximum tensile stress (kg/cm$^2$)"
"$E_{MAX}$  Elongation at the maximum tensile stress (%)"

should read

"$M_{50}$  : Tensile stress at 50% elongation (kg/cm$^2$)"
"$T_{MAX}$ : Maximum tensile stress (kg/cm$^2$)"
"$E_{MAX}$ : Elongation at the maximum tensile stress (%)"

Column 11, line 19 - "SiCH$_2$CH(CH$_3$)$_{CH2}$SH" should read "SiCH$_2$CH(CH$_3$)CH$_2$SH"

Signed and Sealed this

Twentieth Day of November 1984

[SEAL]

Attest:

GERALD J. MOSSINGHOFF

Attesting Officer        Commissioner of Patents and Trademarks

UNITED STATES PATENT AND TRADEMARK OFFICE
CERTIFICATE OF CORRECTION

PATENT NO. : 4,436,787
DATED : March 13, 1984
INVENTOR(S) : Ryuzo Mikami and Katsuyoshi Nakasuji It is certified that error appears in the above-identified patent and that said Letters Patent is hereby corrected as shown below:

Column 2, line 24, - "silicone-" should read "silicon-"

Column 3, line 11 - "alkyl;" should read "allyl;"

Column 11, line 43 - "silicone-" should read "silicon-"

Signed and Sealed this

Twenty-fourth Day of September 1985

[SEAL]

Attest:

DONALD J. QUIGG

Attesting Officer

Commissioner of Patents and
Trademarks—Designate